J. B. ADER AÎNÉ.
Composition for Water-Filter.
No. 217,970.  Patented July 29, 1879.
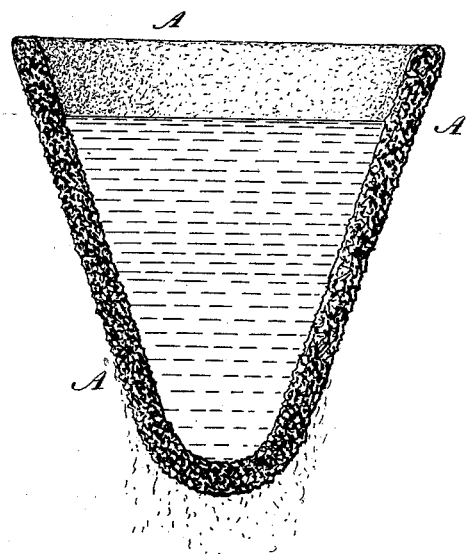
WITNESSES:
C. Neveux
E. Sedgwick
INVENTOR:
J. B. Ader aîné
BY Munn & Co
ATTORNEYS.

UNITED STATES PATENT OFFICE.

JEAN B. ADER, AÎNÉ, OF NEW ORLEANS, LOUISIANA.

IMPROVEMENT IN COMPOSITIONS FOR WATER-FILTERS.

Specification forming part of Letters Patent No. 217,970, dated July 29, 1879; application filed June 21, 1879.

*To all whom it may concern:*

Be it known that I, JEAN B. ADER, Aîné, of New Orleans, in the parish of Orleans and State of Louisiana, have invented a new and useful Improvement in Composition for Water-Filters, of which the following is a specification.

The figure is a detail section of a filter made from my composition.

The object of this invention is to furnish water-filters which shall be so constructed that the water may be filtered by passing through the body of the filtering-vessel, so that the filter may be easily cleaned.

The invention consists in a composition of clay, sand, wood sawdust, pulverized pumice-stone, and English calcimine, mixed together in about equal quantities, with sufficient water to reduce the mixture to a plastic state.

The composition is thoroughly mixed, molded into the desired shape, and then dried or baked in the manner of unglazed pottery.

The filtering-vessels A may be made in the shape shown in the drawing, or of any other desired shape, and of any desired size.

The filters A may be used by introducing the water into the filter and allowing it to pass through into a receiving-vessel; or the filter A may be inserted in the tank, cistern, or other reservoir or vessel containing the water to be filtered, and the filtered water taken from its interior, as may be desired or convenient.

Having thus described my invention, I claim as new and desire to secure by Letters Patent—

A composition for water-filters formed of clay, sand, wood sawdust, pulverized pumice-stone, and English calcimine, mixed together in about equal quantities, with sufficient water to reduce the mixture to a plastic state, substantially as herein shown and described.

JEAN BERTRAND ADER, AÎNÉ.

Witnesses:
ANTOINE BRD. DEMBRUN,
ERNEST MOREL.